(12) United States Patent
Singh (10) Patent No.: US 8,332,320 B2
(45) Date of Patent: Dec. 11, 2012

(54) TECHNIQUES FOR REMOTE CONTROLLED PHYSICAL TRANSACTIONS WITH DYNAMIC KEY GENERATION AND AUTHENTICATION

(75) Inventor: Saheednanda Singh, Thoudam (IN)

(73) Assignee: Novell, Inc., Provo, UT (US)

( * ) Notice: Subject to any disclaimer, the term of this patent is extended or adjusted under 35 U.S.C. 154(b) by 544 days.

(21) Appl. No.: 12/605,023

(22) Filed: Oct. 23, 2009

(65) Prior Publication Data

US 2011/0055084 A1 Mar. 3, 2011

Related U.S. Application Data (60) Provisional application No. 61/238,331, filed on Aug. 31, 2009.

(51) Int. Cl.
*G06Q 40/00* (2012.01)
(52) U.S. Cl. ............ 705/43; 705/40; 705/14.1; 705/1.1; 705/38; 705/35
(58) Field of Classification Search .................... 705/1.1, 705/43, 38, 40, 14.1, 35, 4; 235/379, 380, 235/375, 440, 472.02; 455/414.1
See application file for complete search history.

(56) References Cited

U.S. PATENT DOCUMENTS

| | | | |
|---|---|---|---|
| 5,550,821 | A | 8/1996 | Akiyoshi |
| 5,784,439 | A | 7/1998 | Nagelmann et al. |
| 5,949,779 | A | 9/1999 | Mostafa et al. |
| 6,837,436 | B2 * | 1/2005 | Swartz et al. ............ 235/472.02 |
| 7,890,433 | B2 * | 2/2011 | Singhal ........................... 705/64 |
| 2002/0055835 | A1 * | 5/2002 | Carcoba Olivares et al. ..... 704/9 |
| 2003/0043751 | A1 | 3/2003 | Nelson |
| 2009/0070846 | A1 | 3/2009 | St. Laurent et al. |

OTHER PUBLICATIONS

Kuykendall, Lavonne Credit Card Management, v 12, n 8, p. 78-83, Nov. 1999 Document Type: Periodical; Feature ISSN: 0896-9329 Journal Code: CCM.*

* cited by examiner

*Primary Examiner* — John H Holly
(74) *Attorney, Agent, or Firm* — Schwegman, Lundberg & Woessner, P.A.

(57) ABSTRACT

Techniques for remote controlled physical transactions with dynamic key generation and authentication are provided. A portable device is accessed remotely and separately from an Automated Teller Machine (ATM). The portable device is used to authenticate and initiate a cash transaction. The portable device is supplied a dynamically generated key and the key is provided to the ATM to finalize the transaction and cash is dispensed via the ATM.

19 Claims, 3 Drawing Sheets

TECHNIQUES FOR REMOTE CONTROLLED PHYSICAL TRANSACTIONS WITH DYNAMIC KEY GENERATION AND AUTHENTICATION

RELATED APPLICATIONS

The present application is with, a non-provisional of, and claims priority to U.S. Provisional Application Ser. No. 61/238,331; entitled: "Remote Controlled Trusted Model of Physical Data Transaction with Dynamic and Temporary Key Generation Mechanism," and filed on Aug. 31, 2009; the disclosure of which is incorporated by reference herein and below in its entirety.

BACKGROUND

Increasingly, individuals, governments, and enterprises are relying on technology to complete daily activities and transactions in an automated manner and without the human assistance.

Kiosks are now commonplace at stores and other locations where people frequent (sporting venues, government facilities, etc.). These kiosks perform a variety of operations without human assistance, such as dispensing products (soda, candy, food, iPods, socks (at a bowling alley), etc.), dispensing lottery tickets, dispensing cash (Automated Teller Machines (ATM's)), dispensing videos, collecting payment for services (car washes, movie/theatre tickets, sporting event tickets, parking fees, grocery checkout, etc.) and the like.

Some kiosks are obviously more intelligent and can perform more complex operations than other kiosks. For example, an ATM requires secure access to a banking network and access to bank accounts whereas as a soda machine requires no network access and simply needs a mechanism to count currency and dispense sodas and in some instances dispense change.

More intelligent and complex kiosks, such as ATM's are also typically more vital to individuals or customers, such that individuals expect these machines to be available and to function properly without error and with a high degree of security. These consumer expectations require significant physical security (cameras, lighting, physical layout and position, etc.); quality assurance software (authentication mechanisms to validate personal magnetic cards, passwords, etc. received from the customer); and hardware (power, display, magnetic card reader, currency dispenser, network connectivity, etc.) in order for proper performance to be assured to customers.

These more complex kiosks still have a number of drawbacks. For example, sometimes the sun hits the display of an ATM and the customer cannot see what is being asked on the display screen. In another case, a display may malfunction and not display information at all in which case a customer will not be able to complete a needed transaction.

Security can also be an issue, when an individual is at a line for an ATM, such as at a sporting event, people behind a customer at the kiosk can see the keys being entered by the customer, potentially exposing the pass code of the customer. Additionally, the longer a customer is physically standing in front of an ATM waiting to conclude his/her transaction (acquire his/her currency), the more vulnerable that customer becomes to a criminal desiring to liberate the customer of his/her cash.

Another drawback of an ATM is that the individual possessing an ATM card has to be physically present at the ATM, which is dispensing the currency. So, someone's spouse or child cannot use an ATM without having the card owner's card in his/her physical possession and without knowing the proper passcode for using the card. Thus, conventional ATM's are also not as convenient as they should be.

Accordingly, what is needed is improved flexibility and security with physical transactions conducted at intelligent kiosks, such as ATM's.

SUMMARY

In various embodiments, techniques for remote controlled physical transactions with dynamic key generation and authentication are presented. More specifically, and in an embodiment, a method for performing a remote controlled ATM transaction is provided. A request for a cash transaction is received from a personal mobile device of a customer. Next, a unique serial number is acquired for an automated teller machine (ATM) that is in proximity to the customer. Authentication screens, typically presented on the ATM to the customer, are presented on a display of the personal mobile device. The customer is authenticated for the cash transaction via input data supplied by the customer and in response to the authentication screens and via the personal mobile device. Finally, a secure code is generated; the secure code is to be supplied to the ATM to complete the cash transaction once the customer is authenticated via the input data.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "personal mobile device" as used herein is any portable device capable of wirelessly connecting to a network and having one or more processors and memory. The personal mobile device can include such things as: a personal digital assistant (PDA), a phone, a mini laptop designed to connect to a network and having limited processor/memory capabilities, etc.

Various embodiments of this invention can be implemented in existing network architectures. For example, in some embodiments, the techniques presented herein are implemented in whole or in part in the Novell® network, operating system (OS), and/or proxy server products, distributed by Novell®, Inc., of Provo, Utah.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and are processed on the machines configured to perform the methods.

Of course, the embodiments of the invention can be implemented in a variety of architectural platforms, proxies, devices, operating and server systems, and/or applications. Any particular architectural layout or implementation presented herein is provided for purposes of illustration and comprehension only and is not intended to limit aspects of the invention.

Figure 1:
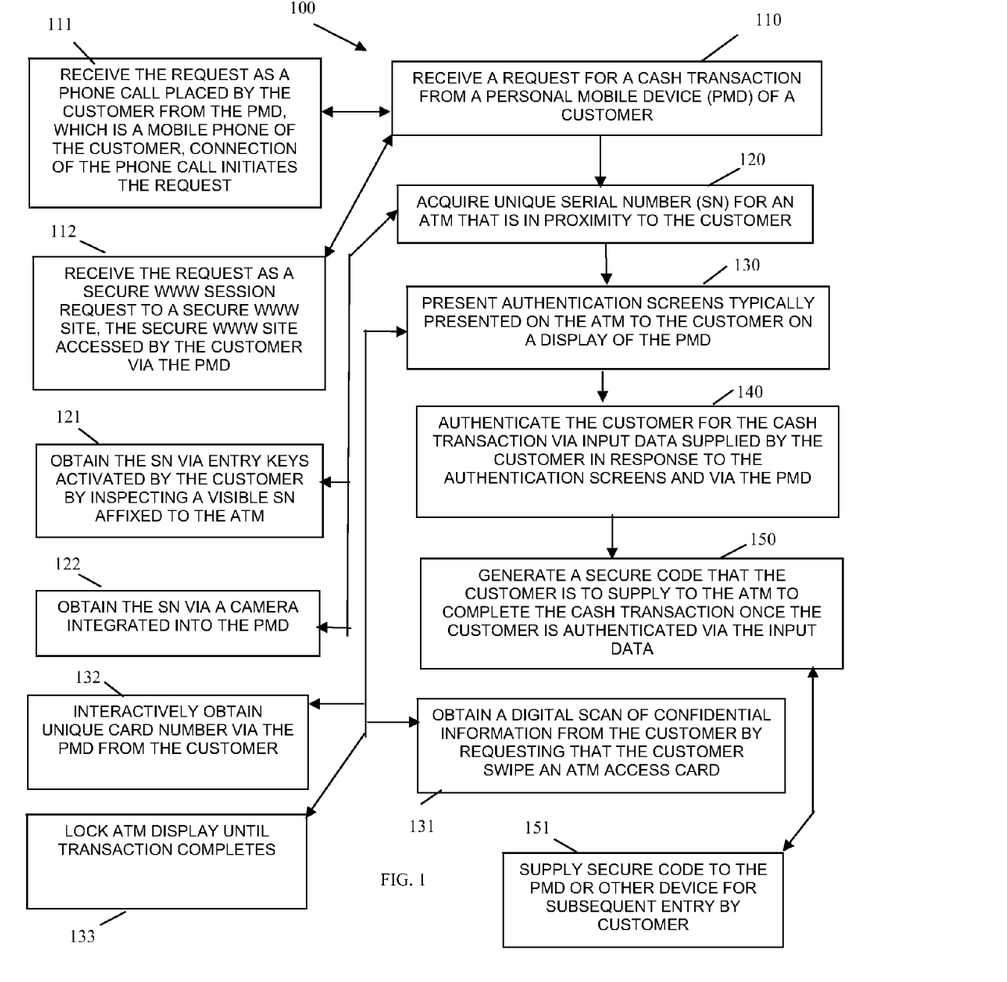
FIG. 1 is a diagram of a method for performing a remote controlled ATM transaction, according to an example embodiment.
Figure 2:
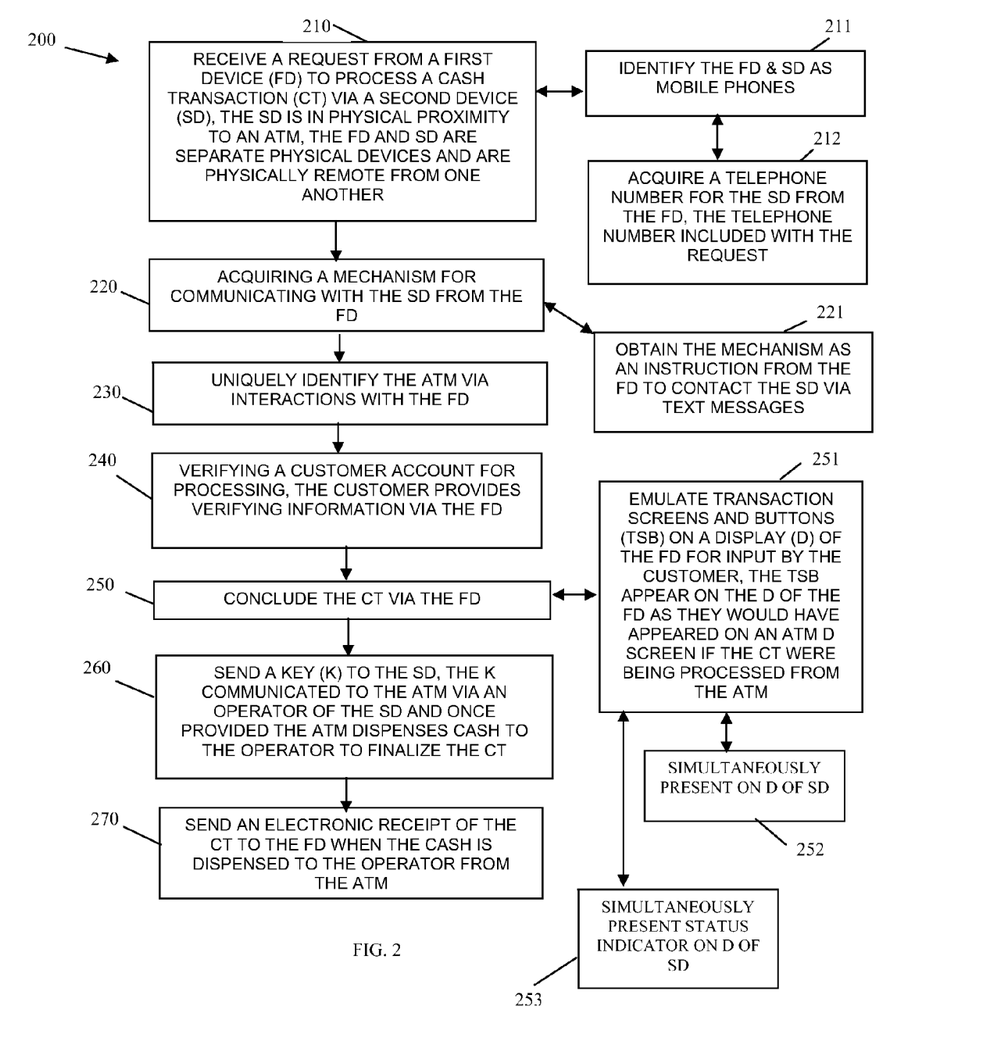
FIG. 2 is a diagram of another method for performing a remote controlled ATM transaction, according to an example embodiment.
Figure 3:
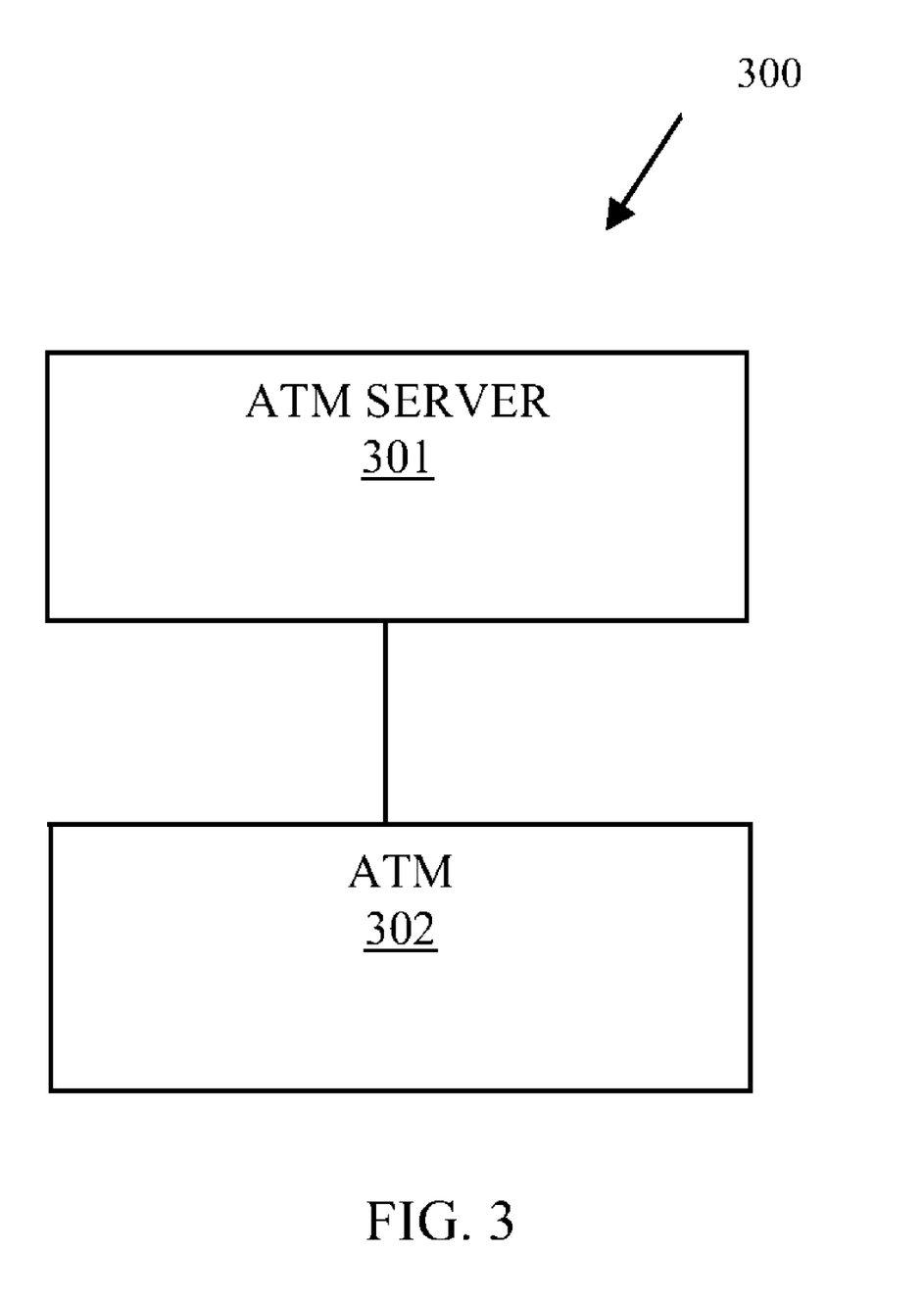
FIG. 3 is a diagram of a remote-controlled ATM system, according to an example embodiment.

It is within this context that embodiments of the invention are now discussed within the context of FIGS. 1-3.

FIG. 1 is a diagram of a method 100 for performing a remote controlled ATM transaction, according to an example embodiment. The method 100 (hereinafter "ATM network service") is implemented in a machine-accessible and computer-readable medium as instructions that execute on one or more processors (machines, computers, processors, etc.). The machine is specifically configured to process the ATM network service. Furthermore, the ATM network service is operational over and processes within a network, such as the Internet, phone network, etc. The network may be wired, wireless, or a combination of wired and wireless.

At 110, the ATM network service receives a request for a cash transaction, or other ATM transaction, from a personal mobile device of a customer. That is, the personal mobile device is carried on the person or with the customer.

According to an embodiment, at 111, the ATM network service receives the request as a phone call that is placed by the customer using the personal mobile device. So, a specific phone number that the customer uses to call activates the processing of the ATM network service. The answering of the call initiates the request. The ATM network service can also acquire the number associated with the personal mobile device when it automatically answers the call and establishes a connection with the personal mobile device over the network.

It is again noted that the network can be the Internet, a phone cellular network, a satellite network, a landline phone network, or various combinations of all these different types of networks.

In another case, at 112, the ATM network service receives the request as a secure World-Wide Web (WWW) session request to a secure WWW site accessed by the customer via the personal mobile device. Here, the personal mobile device establishes an Internet connection and uses a secure communication protocol, such as secure sockets layer (SSL) via Hypertext Transfer Protocol (HTTP) referred to as HTTPS, to connect to the ATM network service and make the request.

At 120, the ATM network service acquires a unique serial number of other type of unique identifier for an Automated Teller Machine (ATM) that is in proximity (a configurable geographic distance) to the customer and the personal mobile device of the customer. Essentially, the request is made by the customer via the personal mobile device for purposes of the customer using the personal mobile device to conduct a remote controlled transaction with the ATM, where that ATM is in the vicinity of the customer.

The exact distance between the personal mobile device and the ATM can be configured via policy. In some cases for security reasons the distance may be such that the ATM has to be capable of using a wireless discovery protocol to identify the personal mobile device. In other cases, as discussed below with reference to the method 200 of the FIG. 2, the distance between the initiating device can be significant and remote as long as another device is present and within the vicinity of the ATM (again this is discussed in greater detail below with reference to the method 200 of the FIG. 2.).

According to an embodiment, at 121, the ATM network service obtains the unique serial number via entry keys activated and punched by the customer. The customer acquires the unique serial number by visually inspecting the ATM for the serial number and then uses the personal mobile device to enter the serial number for communication to the ATM network service. It may also be the case that the customer has previously used a particular ATM and knows the ATM serial number or identifier to enter. In another situation as is discussed below with reference to the method 200 of the FIG. 2, the customer is in communication with a third-party that is physically in front of the ATM and provides the serial number for the customer to enter via the personal mobile device of the customer.

In a more automated approach, at 122, the ATM network service obtains the serial number of the ATM via a scanned image transmitted from the personal mobile device over the network to the ATM network service. Here, the customer uses an integrated camera associated with the personal mobile device to scan a bar code or serial number and to transmit that image to the ATM network service.

At 130, the ATM network service presents authentication screens, which are typically presented on the ATM to customers via a display of the ATM. These authentication screens or some modified version of these authentication screens are presented to the customer on the customer's personal mobile device and not the ATM display. At this point the ATM network service attempts to identify the customer and authenticate the customer for access to cash in an account associated with the customer. This can be done in a variety of ways.

For example, at 131, the ATM network service obtains a digital scan or reading of confidential information for the customer by requesting that the customer swipe an access card in possession of the customer through a card reader that is integrated into the personal mobile device. The card reader may be a magnetic card reader or may be an optical scanner that scans a bar code on the access card having the confidential information or some portion thereof.

In another situation, at 132, the ATM network service can interactively obtain the unique card number associated with an access card of the customer via entry data supplied by the customer on the personal mobile device. Here, the customer manually enters the card number via an input mechanism of the personal mobile device, such as via keys or via touch screen keys.

In one case, and for additional security, at 133, the ATM network service can communicate over the network to the ATM and instruct the ATM to lock the display of the ATM until the pending cash transaction with the customer completes. So, if the customer is not physically at the ATM at this point in time, the ATM is unusable and may even display a message such as "remote transaction in progress if you are not the customer performing this transaction please step away from the ATM," etc. In an alternative approach, the display is locked but presents the activity that is occurring via the personal mobile device on the display of the ATM for the customer to view as a status indicator.

At 140, the ATM network service authenticates the customer for the cash transaction via input data supplied by the customer in response to the authentication screens via the personal mobile device. That is, the customer typically has to have more then possession of an access card, the customer must also have some security information (input data). This input data is supplied via the personal mobile device and not via the ATM. This can include traditional inputs such as personal identification numbers, passwords, etc. or can include non-traditional inputs such as a retinal scan, facial scan, and fingerprint, taken via a camera of the personal mobile device.

At 150, the ATM network service generates a secure code or key that the customer is asked to supply to the ATM directly for purposes of completing the cash transaction. This secure code is provided once the customer is successfully authenticated via the processing at 140. The secure code can be supplied in a number of fashions by the ATM network service to the customer for purposes of completing the transaction via the ATM.

For example, at 151, the ATM network service can supply the secure code to the personal mobile device via a text message or an email. In other cases, the ATM network service supplies the secure code to a different device that is separate from the personal mobile device and one that the customer previously configured to receive the secure code, such as a different cell phone of the customer an email account independent of any particular device, and the like. In some situations, the ATM network service may even send an automated voice message to a particular phone number where the secure code is verbally spoken.

Once the secure code is provided to the customer in a manner that the customer previously configured or expected, the cash transaction is completed when the customer supplies or communicates that secure code to the ATM. This can be done by directly entering the secure code on the keypad or touch screen of the ATM, via entering the secure code into the personal mobile device that communicates wirelessly to the ATM, or even via a bar code displayed on the personal mobile device and scanned via a bar code scanner integrated into the ATM.

Once the ATM verifies the secure code, the cash is dispensed from the ATM and an account of the customer is debited with the financial institution from which the funds are being obtained.

It is noted that the secure code is dynamically communicated to the ATM or alternatively, the ATM upon acquiring the secure code contacts the ATM network service and verifies the code. The code also instructs the ATM to perform the cash transaction and dispense the cash. The secure codes or keys are dynamically generated and can be randomly generated. They are also temporary meaning that if the customer does not use the secure code with the specific ATM requested within a configurable period of time after the secure code is provided, then the secure code becomes invalid and the customer must initiate another remote controlled transaction with the ATM network service.

FIG. 2 is a diagram of another method 200 for performing a remote controlled ATM transaction, according to an example embodiment. The method 200 (hereinafter "remote-controlled service" is implemented in a machine-accessible and computer-readable storage medium as instructions that execute on one or more processors of a network server. The remote-controlled service is operational over a network. The network may be wired, wireless, or a combination of wired and wireless. Furthermore, the processor is specifically configured to process the remote-controlled service.

The remote-controlled service represents another and in some cases enhanced perspective of the ATM network service represented by the method 100 of the FIG. 1.

The processing scenario of the remote-controlled service represents a situation where the personal mobile device of the customer having the account for which cash is being dispensed is remotely located from the ATM dispensing the cash and is not in the vicinity or proximity to the ATM.

At 210, the remote-controlled service receives a request from a first device to process a cash transaction via a second device. The second device is actually in proximity to the ATM that is to process the cash transaction. The first and second devices are different, separate, and independent devices. The first device is in the possession of a first user or person and the second device is in the possession of a second a different user or person.

According to an embodiment, at 211, the remote-controlled service identifies the first and second devices as mobile phones. At 212, the remote-controlled service acquires a telephone number for the second device from the first device. That is, the remote-controlled service is informed in an automated fashion via the request that the second device, identified via a telephone number, is to perform the cash transaction at an ATM as surrogate for the first device. The first device will authenticate and conduct the transaction and the second device will complete authentication with the ATM and the individual having the second device will receive cash from the ATM.

At 220, the remote-controlled service acquires a mechanism for automatically communicating with the second device from the first device. That is, the user of the first device (customer of an account that is being used for the cash transaction) uses the first device to configure the remote-controlled service for communicating directly with the second device, which is in proximity to the ATM.

In a particular scenario, at 221, the remote-controlled service obtains the mechanism as an instruction from the first device to contact the second device via text message communications. Of course other mechanisms may be used as well, such as automate voice, automated phone, web transactions over the Internet via HTTPS, email, etc.

At 230, the remote-controlled service uniquely identifies the ATM via interactions with the first device. So, the second device communicates to the first device the serial number of the ATM. Alternatively, a user of the second device calls the customer of the first device and tells him/her the serial number and the customer enters the serial number via an input mechanism of the first device to communicate the ATM uniquely to the remote-controlled service.

At 240, the remote-controlled service verifies a customer account for processing the cash transaction. The customer provides verifying information expected by a financial institution of the customer and the remote-controlled service authenticates either directly or via a third-party service, such as via an authentication mechanism of the financial institution of the customer. This may also entail swiping a card through a card reader of the first device, scanning a bar code via a camera of the first device, receiving a unique card number via an input mechanism of the first device; and the authentication may entail acquiring confidential information from the customer of the first device, such as a personal identification number (PIN), retinal scan, facial scan, finger print, etc.

At 250, the remote-controlled service concludes the cash transaction via or with the first device by successfully authenticating the customer of the first device for access to the account for cash withdrawn that is being dispensed to the user of a second device in proximity of the ATM.

According to an embodiment, at 251, the remote-controlled service emulates transaction screens and buttons on a display of the first device for input by the customer. Here, the customer provides the transaction details, such as withdraw $100 from my account X and acceptance of a service fee of $1, etc. The transaction details are supplied by the customer via the first device and the remote-controlled service emulates the screens of the ATM on the first device for the customer to provide the transaction details. The screens presented are presented as if they were appearing on the ATM.

Continuing with the embodiment of 251 and at 252, the remote-controlled service simultaneously presents the transaction screens and buttons appearing on the first device on the display of the second device for the user in proximity of the ATM to see. Here, any confidential information, such as PIN's, account numbers, etc. can be edited or redacted out of the presentation appearing on the second device for security purposes.

In another continuation of the embodiment for 251 and at 253, the remote-controlled service simultaneously presents a status indicator on the display of the second device. Here, the user of the second device simply sees that the cash transaction is proceeding and maybe even an indication as to what percent of the transaction is completing.

At 260, the remote-controlled service sends a key to the second device. The key is subsequently communicated to the ATM via the user or operator of the second device. Once the key is successfully provided to the ATM and authenticated by the ATM, the ATM dispenses cash to the operator to finalize and complete the cash transaction.

In an embodiment, at 270, the remote-controlled service sends an electronic receipt to the first device when the cash is dispensed to the operator from the ATM. Here, other details not available to the operator of the second device may be made available to the customer of the first device, such as account balance, etc.

FIG. 3 is a diagram of a remote-controlled ATM system 300, according to an example embodiment. The remote-controlled ATM system 300 is implemented in a machine-accessible and computer-readable storage medium as instructions that execute on one or more processors (multiprocessor) and that is operational over a network. The one or more processors are specifically configured to process the components of the remote-controlled ATM system 300. Moreover, the network may be wired, wireless, or a combination of wired and wireless. In an embodiment, the remote-controlled ATM system 300 implements, among other things, certain aspects of the methods 100 and 200 represented by the FIGS. 1 and 2, respectively.

The remote-controlled ATM system 300 includes an ATM server 301 and an ATM 302. Each of these and their interactions with one another are now discussed in turn.

The ATM server 301 is implemented in a computer-readable storage medium and is to execute on a server of the network. Example processing features associated with the ATM server 301 were presented in detail above with reference to the methods 100 and 200 of the FIGS. 1 and 2, respectively. Method 100 of the FIG. 1 showed a local remote access feature for an ATM transaction and method 200 of the FIG. 2 showed a two-party remote access feature for an ATM transaction. Each of these processing modes (features) is implemented in the ATM server 301.

The ATM server 301 is configured to communicate with one or more portable devices over the network for purposes of authenticating a cash transaction. The cash transaction is ultimately concluded via the dispensing of cash at the ATM. The ATM server 301 is further configured to communicate with the ATM 302 and to instruct that ATM 302 to perform one or more actions including the dispensing of the cash.

The ATM 302 is one that is being accessed either via a customer and that customer's portable device, such as what was described above with reference to the method 100 of the FIG. 1; of, the ATM 302 is one that is being accessed via a user having a second portable device as instructed by a customer and that customer's portable device (two-party transaction), such as what was described above with reference to the method 200 of the FIG. 2.

According to an embodiment, the ATM 302 is configured to wirelessly discover a particular portable device within a configured physical distance of the ATM 302. Here, the ATM 302 is also configured to initiate a communication session between that particular portable device and the ATM server 301 for purposes of initiating a cash transaction. In other words, the discovery of the portable device communicating with the ATM 302 is automatically discovered, such as via blue tooth, infrared, local wireless network, etc. Here, the ATM 302 may be configured to authenticate and trust the portable device and supply the serial number of the ATM 302 directly to the portable device for subsequent communication to the ATM server 301.

In another embodiment, the ATM 302 is configured to scan an image of a key appearing on a display screen of a particular portable device. The key is received from the ATM server 301 to authenticate and conclude the cash transaction. The ATM 302 scans the key from the display screen of the particular portable device and then validates the key with the ATM server 301 and then dispenses the cash from the ATM 302 to conclude the cash transaction.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A non-transitory computer-readable storage medium that is executed by one or more processors of a network to perform a method, comprising:
receiving a request for a cash transaction from a personal mobile device of a customer;
acquiring a unique serial number for an automated teller machine (ATM) that is in proximity to the customer, the proximity is determined based on a configured policy to be a configured geographic distance to the customer;
presenting authentication screens that are presented on the ATM to the customer; however, the authentication screens are presented for interaction on a display of the personal mobile device;

authenticating the customer for the cash transaction via input data supplied by the customer in response to the authentication screens and via the personal mobile device; and generating a secure code that the customer is to supply to the ATM to complete the cash transaction once the customer is authenticated via the input data.

2. The non-transitory computer-readable storage medium of claim 1, wherein receiving further includes receiving the request as a phone call placed by the customer from the personal mobile device, which is a mobile phone of the customer, connection of the phone call initiates the request.

3. The non-transitory computer-readable storage medium of claim 1, wherein receiving further includes receiving the request as a secure World-Wide Web (www) session request to a secure www site, the secure www site accessed by the customer via the personal mobile device.

4. The non-transitory computer-readable storage medium of claim 1, wherein acquiring further includes obtaining the unique serial number via entry keys activated by the customer by inspecting a visible serial number affixed to the ATM.

5. The non-transitory computer-readable storage medium of claim 1, wherein acquiring further includes obtaining the unique serial number via a camera integrated into the personal mobile device, the customer placing a barcode for the unique serial number or an image of the unique serial number affixed on the ATM within view of the camera and the camera taking a digital scan of the barcode or the image, which is provided as the unique serial number.

6. The non-transitory computer-readable storage medium of claim 1, wherein presenting further includes obtaining a digital scan of confidential information from the customer by requesting that the customer swipe an ATM access card through a card reader of the personal mobile device, the confidential information used to acquire an authentication mechanism to use for the customer and to acquire account information for the customer.

7. The non-transitory computer-readable storage medium of claim 1, wherein presenting further includes interactively requesting via the display of the personal mobile device that the customer provide a unique card number or account number via entry keys of the personal mobile device, the unique card number or account number used to acquire an authentication mechanism to use for the customer and to acquire account information for the customer.

8. The non-transitory computer-readable storage medium of claim 1, wherein presenting further includes locking an ATM display associated with the ATM while authentication of the customer proceeds and the cash transaction is completed via the personal mobile device and via the ATM.

9. The non-transitory computer-readable storage medium of claim 1, wherein generating further includes supplying the secure code to the customer via the personal mobile device of the customer of via another different device of the customer, the customer entering the secure code via the personal mobile device or the ATM to complete the cash transaction and have the ATM dispense cash to the customer.

10. A non-transitory computer-readable storage medium that is executed by one or more processors of a network to perform a the method, comprising:

receiving a request from a first device to process a cash transaction via a second device, the second device is in physical proximity to an Automated Teller Machine (ATM), the first and second device are separate physical devices and are physically remote from one another, the first device is in the possession of a first user and the second device is in the possession of a second and different user, the first user has an account that is being used for the cash transaction;

acquiring a mechanism for communicating with the second device from the first device, the first device configures the mechanism for the method to communicate with the second device;

uniquely identifying the ATM via interactions with the first device, the second device communicates a serial number of the ATM to the first device and the first device supplies the serial number to the method;

verifying a customer account for processing the cash transaction, the customer provides verifying information via the first device;

concluding the cash transaction via the first device; and sending a key to the second device, the key communicated to the ATM via an operator of the second device and once provided the ATM dispenses cash to the operator to finalize the cash transaction.

11. The non-transitory computer-readable storage medium of claim 10 further comprising, sending an electronic receipt of the cash transaction to the first device when the cash is dispensed to the operator from the ATM.

12. The non-transitory computer-readable storage medium of claim 10, wherein receiving further includes identifying the first and second devices as mobile phones.

13. The non-transitory computer-readable storage medium of claim 12, wherein identifying further includes acquiring a telephone number for the second device from the first device, the telephone number included with the request.

14. The non-transitory computer-readable storage medium of claim 10, wherein acquiring further includes obtaining the mechanism as an instruction from the first device to contact the second device via text messages.

15. The non-transitory computer-readable storage medium of claim 10, wherein concluding further includes emulating transaction screens and buttons on a display of the first device for input by the customer, the transaction screens and buttons appear on the display of the first device as they would have appeared on an ATM display screen if the cash transaction were being processed from the ATM.

16. The non-transitory computer-readable storage medium of claim 15, wherein emulating further includes simultaneously presenting the transactions screens and buttons in a read only mode on a separate display of the second device for the operator to view real-time progress of the cash transaction, confidential inputs modified to not display on the separate display as those confidential inputs are supplied by the customer of the first device.

17. The non-transitory computer-readable storage medium of claim 15, wherein emulating further includes simultaneously presenting a status indicator screen on a separate display of the second device for the operator to view real-time progress of the cash transaction as the cash transaction proceeds.

18. A multiprocessor-implemented system, comprising:

an Automated Teller Machine (ATM) server implemented in a computer-readable storage medium and to execute on a sever of a network; and an ATM;

the ATM server configured to communicate with one or more portable devices over the network for purposes of authenticating a cash transaction that is concluded via the dispensing of cash at the ATM, the ATM server further configured to communicate with the ATM to alter screens appearing on an ATM display and to instruct the ATM to perform one or more actions including the dispensing of the cash and wherein the ATM is configured to wirelessly discover a particular portable device within a configured physical distance of the ATM and further configured to initiate a communication session between the particular portable device and the ATM server to initiate the cash transaction, and the ATM is further configured to supply a serial number of the ATM directly to the particular portable device for subsequent communication with the ATM during the communication session.

19. The system of claim 18, wherein the ATM is configured to scan an image of a key appearing on a display screen of a particular portable device, the key received from the ATM server to authenticate and conclude the cash transaction and the ATM scans the key from the display screen of the particular portable device and validates the key with the ATM server and then dispenses the cash from the ATM to conclude the cash transaction.

* * * * *

UNITED STATES PATENT AND TRADEMARK OFFICE
CERTIFICATE OF CORRECTION

PATENT NO. : 8,332,320 B2  
APPLICATION NO. : 12/605023  
DATED : December 11, 2012  
INVENTOR(S) : Saheednanda Singh Page 1 of 1

It is certified that error appears in the above-identified patent and that said Letters Patent is hereby corrected as shown below:

On the face page, in column 2, under "Other Publications", line 1, delete "Lavonne Credit Card Management," and insert --Lavonne, "Credit Card Management,"--, therefor On the face page, in column 2, under "Other Publications", line 2, after "Nov. 1999", insert --,--, therefor On the face page, in column 2, under "Other Publications", line 2, after "0896-9329", insert --,--, therefor In column 8, line 65, in Claim 1, delete "customer;" and insert --customer,--, therefor In column 9, line 61, in Claim 10, delete "a the" and insert --the--, therefor Signed and Sealed this  
Nineteenth Day of February, 2013

Teresa Stanek Rea  
*Acting Director of the United States Patent and Trademark Office*